United States Patent
Adkins et al.

(10) Patent No.: US 12,118,073 B2
(45) Date of Patent: *Oct. 15, 2024

(54) CONVERTING STATIC CONTENT ITEMS INTO INTERACTIVE CONTENT ITEMS

(71) Applicant: GOOGLE LLC, Mountain View, CA (US)

(72) Inventors: Sara Adkins, Mountain View, CA (US); Tommy Shimko, Mountain View, CA (US); Miao Xing, Mountain View, CA (US); Nathan Lucash, Mountain View, CA (US); Weiming Liu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,864

(22) Filed: Apr. 10, 2023

(65) Prior Publication Data

US 2023/0244774 A1 Aug. 3, 2023

Related U.S. Application Data

(63) Continuation of application No. 16/759,509, filed as application No. PCT/US2019/064238 on Dec. 3, 2019, now Pat. No. 11,625,472.

(51) Int. Cl.
*G06F 21/36* (2013.01)

(52) U.S. Cl.
CPC ...... *G06F 21/36* (2013.01); *G06F 2221/2133* (2013.01)

(58) Field of Classification Search
CPC ............ G06F 21/36; G06F 2221/2133; G06F 16/958; G06F 40/151; G06F 40/186; G06Q 50/10

(Continued)

(56) References Cited

U.S. PATENT DOCUMENTS 8,621,396 B1 12/2013 Gossweiler, III
8,671,058 B1 * 3/2014 Isaacs ............... G06F 21/36
705/50

(Continued)

FOREIGN PATENT DOCUMENTS

CN 102342165 A 2/2012
CN 106462555 A 2/2017

(Continued)

OTHER PUBLICATIONS

International Search Report and Written Opinion for Application No. PCT/US2019/064238, dated Sep. 10, 2020.

(Continued)

*Primary Examiner* — Jacob Lipman
(74) *Attorney, Agent, or Firm* — MARSHALL, GERSTEIN & BORUN LLP

(57) ABSTRACT

At least one aspect of the present disclosure is directed to systems and methods of converting static content items into interactive content items. A data processing system can identify a first content item. The data processing system can divide, in accordance with a partition template, the visual content of the first content item into a plurality of segments. The partition template can define a number of segments to be formed from the visual content. The data processing system can generate a second script. The second script can assign each segment into a position. The script can enable movement of each segment within the frame. The script can determine that the segments are moved to a target position. The script can perform an action to provide information related to the visual content. The data processing system can provide the second content item to a client device.

18 Claims, 6 Drawing Sheets

(58) Field of Classification Search
USPC .......................................................... 726/7
See application file for complete search history.

(56) References Cited

U.S. PATENT DOCUMENTS

| | | | |
|---|---|---|---|
| 9,495,532 B1 * | 11/2016 | Zhurkin | G06F 21/36 |
| 9,785,619 B1 | 10/2017 | Hill et al. | |
| 11,625,472 B2 * | 4/2023 | Adkins | G06F 21/36 |
| | | | 726/7 |
| 2011/0298691 A1 * | 12/2011 | DeLuca | G06F 21/36 |
| | | | 345/1.3 |
| 2012/0246008 A1 | 9/2012 | Hamilton, II et al. | |
| 2012/0323700 A1 * | 12/2012 | Aleksandrovich | G06F 21/36 |
| | | | 705/14.69 |
| 2013/0047231 A1 * | 2/2013 | Xiao | G06F 21/36 |
| | | | 726/7 |
| 2015/0170204 A1 * | 6/2015 | Inbar | G06Q 30/02 |
| | | | 705/14.55 |
| 2017/0068809 A1 * | 3/2017 | Bhosale | G06F 21/32 |
| 2019/0236250 A1 | 8/2019 | Paxton et al. | |

FOREIGN PATENT DOCUMENTS

| | | |
|---|---|---|
| CN | 109074214 A | 12/2018 |
| CN | 110140144 A | 8/2019 |
| EP | 3 273 377 A1 | 1/2018 |
| JP | 2012-203902 A | 10/2012 |
| JP | 2015-35186 A | 2/2015 |
| JP | 2018-538622 A | 12/2018 |

OTHER PUBLICATIONS

Notice of Reasons for Rejection for Japanese Application No. 2020-520119, dated Feb. 28, 2022.
Tsuchiya et al., "Secure Communications Protocol Between Humans and a Bank Server to Prevent Man in the Browser Attack," Institute of Electronics, Information and Communication Engineers (IEICE) Technical Report, 115 (4):149-157 (2015).
Office Action for Korean Application No. 10-2020-7010067, dated Apr. 13, 2022.
First Examination Report for India Application No. 202027013235, dated Jul. 7, 2022.
Decision of Rejection for Japanese Application No. 2020-520119, dated Aug. 8, 2022.
Office Action for European Application No. 19831959.2, dated Oct. 19, 2022.
Office Action for Korean Application No. 10-2020-7010067, dated Oct. 26, 2022.
Notice of Allowance for Japanese Application No. 2020-520119, dated Jan. 10, 2023.
First Office Action for Chinese Application No. 201980004992.6, dated Jan. 22, 2024.
Jia, "Design and Implementation of Network Topology Visualization System," China Excellent Master's Dissertation Full-text Database Information Technology Series, No. 10. (Oct. 15, 2018).
Tan, "Research on Efficient Association Mining Algorithm for Dynamic Script Web Pages," Computer Knowledge and Technology, Issue 13 (May 5, 2012).

* cited by examiner

CONVERTING STATIC CONTENT ITEMS INTO INTERACTIVE CONTENT ITEMS

CROSS-REFERENCE TO RELATED APPLICATION

This application is a continuation of U.S. patent application Ser. No. 16/759,509, which is the national stage of International Application No. PCT/US19/64238, filed on Dec. 3, 2019. The entire disclosure of each of the above-identified applications is hereby incorporated herein by reference in its entirety.

BACKGROUND

In a computer networked environment such as the internet, third-party content providers provide third-party content items for display on end-user computing devices. These third-party content items can be displayed on a web page associated with a respective publisher. These third-party content items can include content identifying the third-party content provider that provided the content item.

SUMMARY

At least one aspect of the present disclosure is directed to a method for converting static content item images into interactive content items. The method can include identifying, by a data processing system including one or more processors, a first content item having visual content and a first script. The first script can be configured to present the visual content responsive to loading of the first content item. The method can include dividing, by the data processing system in accordance with a partition template, the visual content of the first content item into a plurality of segments. The partition template can define a number of segments to be formed from the visual content, a shape for each segment of the plurality of segments, and dimensions for each shape. Each segment of the plurality of segments can correspond to a differing portion of the visual content. The method can include generating, by the data processing system, a second content item to include the plurality of segments to be presented within a frame and a second script. The second script can be configured to assign, responsive to loading of the second content item, each segment of the plurality of segments into one of a plurality of positions. Each position of the plurality of positions can define a region within the frame at which the segment is to be presented. The second script can be configured to present the plurality of segments within the frame in accordance with the plurality of positions assigned to each segment of the plurality of segments. The second script can be configured to enable, via interaction, movement of each segment of the plurality of segments among the plurality of positions within the frame. The second script can be configured to determine, responsive to detection of an interaction with one of the plurality of segments, that the plurality of segments are moved from the plurality of positions to a target plurality of positions. The second script can be configured to perform, responsive to determining that the plurality of segments are moved to the target plurality of positions, an action to provide information related to the visual content. The method can include providing, by the data processing system, the second content item to a client device to cause the client device to present the plurality of segments in accordance with the second script.

In some implementations, the method can include selecting, by the data processing system, the partition template from a plurality of partition templates based on visual content of the first content item. In some implementations, dividing the visual content further comprises dividing the visual content into the plurality of segments in accordance with the partition template, responsive to selecting the partition template from the plurality of partition templates.

In some implementations, the method can include determining, by the data processing system, for each partition template of plurality of partition templates, a predicted interaction rate with the visual content divided in accordance with a corresponding partition template. In some implementations, the method can include selecting, by the data processing system, the partition template from the plurality of partition templates based on the predicted interaction rate determined for each partition template of the plurality of partition templates. In some implementations, dividing the visual content further comprises dividing the visual content into the plurality of segments in accordance with the partition template, responsive to selecting the partition template from the plurality of partition templates.

In some implementations, the method can include determining, by the data processing system, that the first content item is eligible for addition of interactivity based on the visual content of the first content item. In some implementations, dividing the visual content further comprises dividing the visual content into the plurality of segments in accordance with the partition template, responsive to determining that the first content item is eligible.

In some implementations, the method can include identifying, by the data processing system, an initial plurality of positions for the plurality of segments as the target plurality of positions. Each position of the initial plurality of positions can define a region within the visual content of the first content item from which the segment is taken. In some implementations, generating the second content item further comprises generating the second content item to include the second script configured to determine, responsive to detection of the interaction with one of the plurality of segments, that the plurality of segments are moved from the plurality of positions to the initial plurality of positions.

In some implementations, the second script can be configured to present a prompt for initiation of interactivity with the second content item within the frame. In some implementations, the second script can be configured to present, responsive to detecting an interaction with the prompt, the plurality of segments within the frame in accordance with the plurality of positions.

In some implementations, the method can include generating the second content item to include the second script configured to perform the action, the action including presenting a prompt to present the information related to the visual content, the information provided by a content provider associated with the first content item.

In some implementations, the method can include dividing the visual content into the plurality of segments in accordance with the partition template. The partition template can include a segmentation path to define the number of segments to be formed, the shape for each segment of the plurality of segments, and the dimensions for each shape.

In some implementations, the method can include receiving, from a content provider, a request to include interactivity into content, the request including the first content item. In some implementations, the method can include receiving, by the data processing system, from the client device responsive to performing the action, an indication that the plurality of segments is moved to the first plurality of positions.

Another aspect of the present disclosure is directed to a system. The system can include a data processing system having one or more processors. The data processing system can identify a first content item having visual content and a first script. The first script configured to present the visual content responsive to loading of the first content item. The data processing system can divide, in accordance with a partition template, the visual content of the first content item into a plurality of segments. The partition template can define a number of segments to be formed from the visual content, a shape for each segment of the plurality of segments, and dimensions for each shape. Each segment of the plurality of segments can correspond to a differing portion of the visual content. The data processing system can generate a second content item to include the plurality of segments to be presented within a frame and a second script, the second script. The second script can be configured to assign, responsive to loading of the second content item, each segment of the plurality of segments into one of a plurality of positions. Each position of the plurality of positions can define a region within the frame at which the segment is to be presented. The second script can be configured to present the plurality of segments within the frame in accordance with the plurality of positions assigned to each segment of the plurality of segments. The second script can be configured to enable, via interaction, movement of each segment of the plurality of segments among the plurality of positions within the frame. The second script can be configured to determine, responsive to detection of an interaction with one of the plurality of segments, that the plurality of segments are moved from the plurality of positions to a target plurality of positions. The second script can be configured to perform, responsive to determining that the plurality of segments are moved to the target plurality of positions, an action to provide information related to the visual content. The data processing system can provide the second content item to a client device to cause the client device to present the plurality of segments in accordance with the second script.

In some implementations, the data processing system can select the partition template from a plurality of partition templates based on visual content of the first content item. In some implementations, the data processing system can divide the visual content into the plurality of segments in accordance with the partition template, responsive to selecting the partition template from the plurality of partition templates.

In some implementations, the data processing system can determine for each partition template of plurality of partition templates, a predicted interaction rate with the visual content divided in accordance with a corresponding partition template. In some implementations, the data processing system can select the partition template from the plurality of partition templates based on the predicted interaction rate determined for each partition template of the plurality of partition templates. In some implementations, the data processing system can divide the visual content into the plurality of segments in accordance with the partition template, responsive to selecting the partition template from the plurality of partition templates.

In some implementations, the data processing system can determine that the first content item is eligible for addition of interactivity based on the visual content of the first content item. In some implementations, the data processing system can dividing the visual content into the plurality of segments in accordance with the partition template, responsive to determining that the first content item is eligible.

In some implementations, the data processing system can identify an initial plurality of positions for the plurality of segments as the target plurality of positions. Each position of the initial plurality of positions can define a region within the visual content of the first content item from which the segment is taken. In some implementations, the data processing system can generate the second content item to include the second script configured to determine, responsive to detection of the interaction with one of the plurality of segments, that the plurality of segments are moved from the plurality of positions to the initial plurality of positions.

In some implementations, the second script can present a prompt for initiation of interactivity with the second content item within the frame. In some implementations, the second script can present, responsive to detecting an interaction with the prompt, the plurality of segments within the frame in accordance with the plurality of positions.

In some implementations, the data processing system can generate the second content item to include the second script configured to perform the action. The action can include presenting a prompt to present the information related to the visual content. The information can be provided by a content provider associated with the first content item.

In some implementations, the data processing system can divide the visual content into the plurality of segments in accordance with the partition template. The partition template can include a segmentation path to define the number of segments to be formed, the shape for each segment of the plurality of segments, and the dimensions for each shape.

In some implementations, the data processing system can receive, from a content provider, a request to include interactivity into content, the request including the first content item. In some implementations, the data processing system can receive, from the client device responsive to performing the action, an indication that the plurality of segments are moved to the first plurality of positions.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
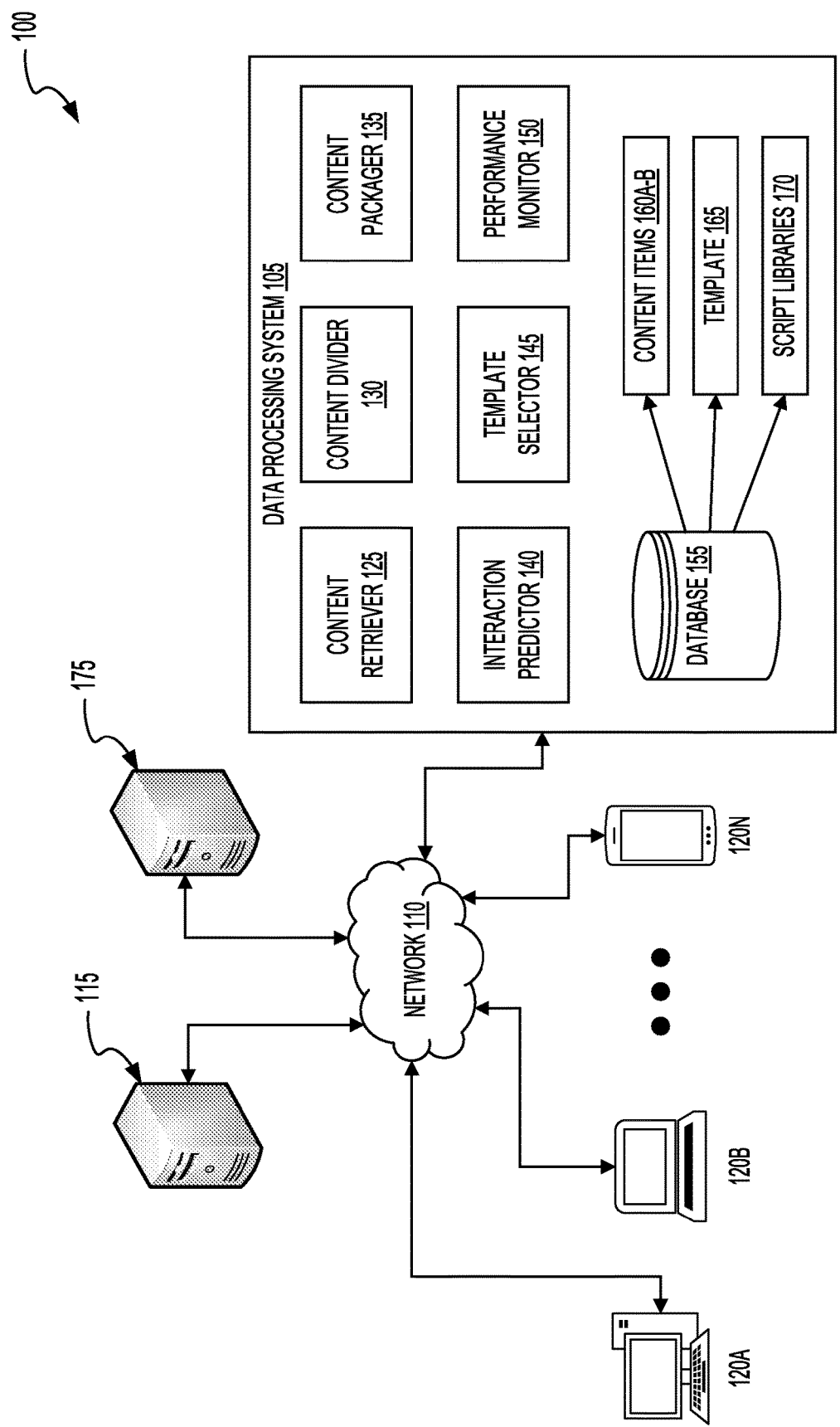
FIG. 1A shows a block diagram depicting an example environment or system for converting static content items into interactive content items.

Below are detailed descriptions of various concepts related to, and implementations of, methods, apparatuses, and systems of converting static content into interactive content. The various concepts introduced above and discussed in greater detail below may be implemented in any of numerous ways, as the described concepts are not limited to any particular manner of implementation.

Content provider platforms can provide static content items for presentation on information resources (e.g., webpages) and with which a human user interacts. In some situations, a content provider platform may wish to ensure that the user is a human user, to prevent or at least detect when interaction with the provided content item is performed by an automated agent, or bot. A number of mechanisms, such as CAPTCHA checks, are currently in use to perform this function, but additional mechanisms may be desired. Further, CAPTCHA checks often require additional data to be transmitted to the user device and disrupt the provision of the information that the user has requested.

Content items provided by content provider platforms may include static content items. Static content items may include a wide variety of content, such as text, images, videos, and audio, or any combination thereof. Such content items, however, have limited functionality, especially with respect to interactivity. For example, the content item may only redirect an application (e.g., a web browser) to another information resource (also referred herein as a landing page), in response to an interaction. Because static content items have less interactivity, static content items can result in less human-computer interaction (HCI) than a comparable interactive content item. Furthermore, by transmitting static content items which do not elicit interaction (e.g., low click-through rate and HCI), content provider platforms waste network resources that could otherwise have been used for content that elicit interaction or other response from the user.

Interactive content items may address some of the drawbacks with static content items, and may increase user interactivity and interaction performance with content items. Interactive content items may be shown to improve the click-through rates of content items when compared to static image or text based content items. Static based content items distinguish from interactive content items in that they may not provide any interaction beyond redirection to a landing page associated with the publisher of the content item. On the other hand, interactive content items can provide more opportunities for user interaction and engagement than static content items, and may be, for example, a small game. But interactive content items may entail significantly more development time on the part of the content publisher, which can be prohibitive to both small and large content publishers. Further, due to the effort required to create interactive content items, quality across different providers and platforms can vary greatly. Due to their complexity, manually created interactive content items may be large, consuming disk space or memory, and thus consume a larger amount of network resources, when communicated across computer networks.

To address the foregoing technical problems, a content distribution platform can automatically generate interactive content items from images, video, or text based assets received from a content publisher. The assets may be initially static, with little interactivity other than redirection to a landing page upon interacting with the content item. The platform can analyze the assets received from the content publisher and generate HTML5 and JavaScript instructions to create a bundle that can be provided to client devices for execution in a web browser or native application. The generated bundle can provide interactive content items, which can provide feedback about client device interactions with the content items to the content distribution platform. Each of these steps can be performed by a content distribution platform utilizing an interactive content pipeline provided by the systems and methods described herein, thereby providing a convenient and fast way to generate interactive content items from static assets.

To generate the bundle, the content distribution platform can identify an image asset provided by the content publisher to determine whether the asset is eligible for incorporation into an interactive content item. After determining that the asset is eligible for interactivity, the content distribution platform can generate the interactive bundle by dividing the static content into many pieces or segments using a partition template. The partition template may be, for example, a scalar vector graphic path, and can define the number of segments to be generated, the size of each segment, the shapes of the segment, and the positions of the segment relative to each other. The segments may correspond to interlocking portions of the static asset in the form of, for example, a puzzle piece. In conjunction with dividing the static assets into segments, the content provider platform can generate a script that governs the behavior of the interactive content item when executed on a client device. After the script has been generated, the content provider platform can combine the generated segments and the generated script into an HTML5 bundle, which can be provided to the client device for execution. Furthermore, each of these steps can take place without intervention or guidance from the content distribution platform, enabling quick and automatic generation of interactive content.

Once loaded on a client device, the script can cause the client device to render and randomly distribute the generated segments within the content item frame on the client device, and allow a user to interact with the segments to move them to different locations. The script can randomly distribute the segments each time the script is executed on a client device, providing a different experience each time the interactive content item is displayed. In addition, the script can provide progress updates to the platform regarding the interactions between the end user and the interactive content item. For example, the script can provide the platform with an indication that the segment has been returned to their original positions (e.g., the puzzle has been solved).

The technical solution described herein can thus provide content items that require interaction by a user, before further actions are enabled. This can enable a content provider to determine that the entity interacting with the content item is a human user, rather than an automated agent. This can also be achieved in the course of providing content that would otherwise be provided and without the need to provide, execute and store additional interactive elements, such as CAPTCHAs. Further, the solution described herein can provide increased human-computer interaction by generating interactive content items, and significantly reduce the development time of complex HTML5 based content items. By transmitting interactive content items, which have a higher click-through rate and interactivity, the content provider platform can better utilize network resources efficiently, relative to communicating static content items. Furthermore, by generating the HTML5 bundle within predetermined size requirements, memory and disk space may be conserved and the amount of network resources used may be reduced when communicating interactive content items. The predetermined size requirements allow the content provider platform to control and improve the network utilization of the generated interactive content items.

Referring now to FIG. 1A, depicted is a block diagram of a system or environment 100 to convert static content items into interactive content items. The environment 100 can include at least one computer network 110. The environment 100 can include at least one content publisher 115. The environment 100 can include at least one content provider 175. The environment 100 can include at least one client device 120A-N (hereinafter generally referred to as client device 120). The environment 100 can include at least one data processing system 105. The data processing system 105 can include at least one content retriever 125, at least one content divider 130, at least one content packager 135, at least one interaction predictor 140, at least one template selector 145, and at least one performance monitor 150. The data processing system 105 can include at least one database 155. In some implementations, the data processing system 105 can include the content publisher 115. In some implementations, the data processing system 105 can include the content provider 175. In some implementations, the database 155 can be external to the data processing system 105. The database 155 can include content items 160A and 160B (hereinafter generally referred to as content items 160), templates 165, and script libraries 170.

Figure 5:
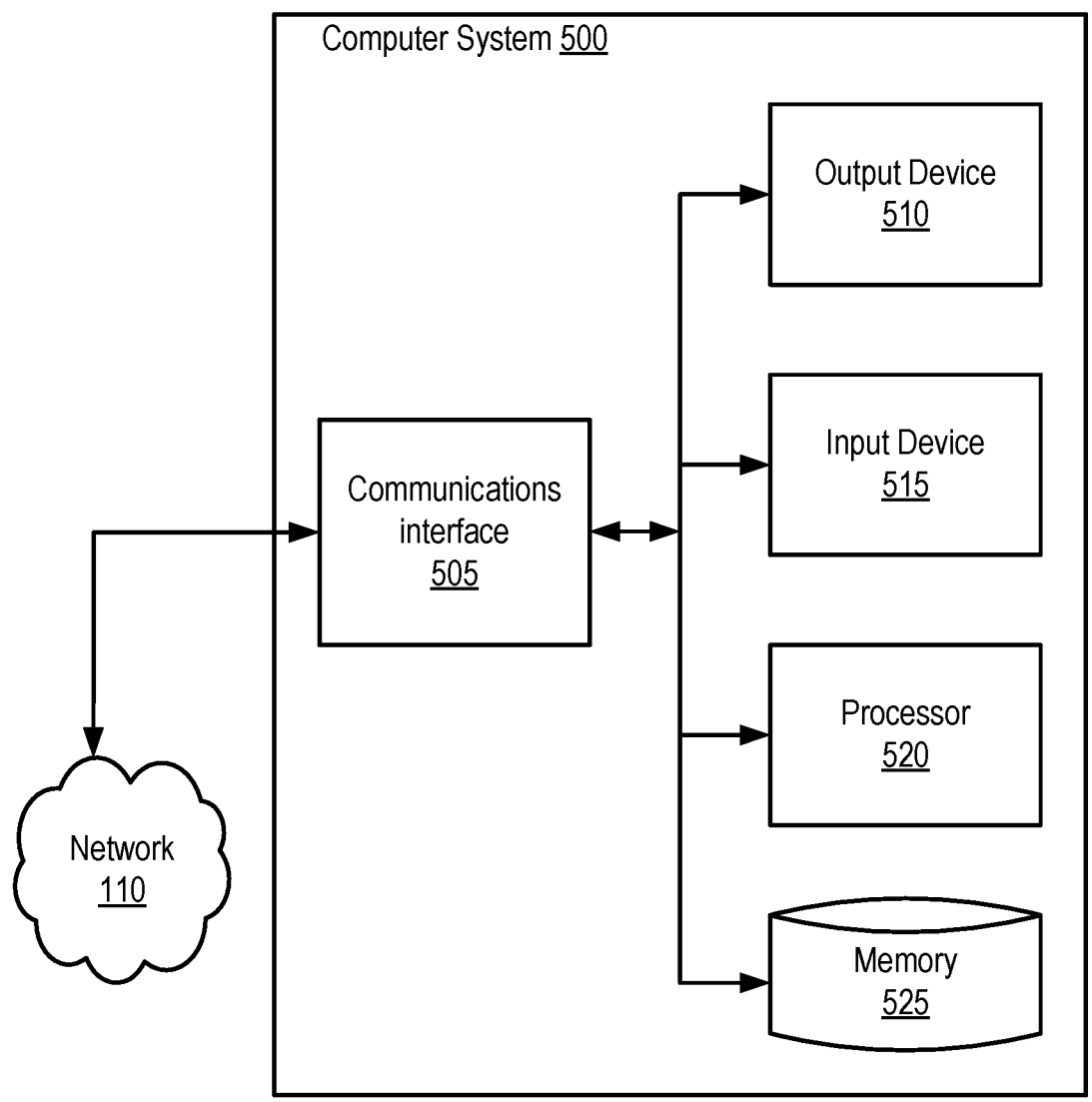
FIG. 5 shows a block diagram of the general architecture of an illustrative computer system that may be employed to implement any of the computers discussed herein.

Each of the components (e.g., the network 110, the content publisher 115, the content provider 175, the client devices 120, the data processing system 105, the content retriever 125, the content divider 130, the content packager 135, the interaction predictor 140, the template selector 145, the performance monitor 150, the database 155, the content items 160A and 160B, the template 165, and the script libraries 170) of the environment 100 can be implemented using the hardware components or a combination of software with the hardware components of a computing system 500 detailed herein in conjunction with FIG. 5. For example, the data processing system 105 can include servers or other computing devices. The content provider 175 and the content publisher 115 can also include servers or other computing devices. Each of the components of the data processing system 105 can perform the functionalities detailed herein.

The network 110 can include computer networks such as the Internet local, wide, metro or other area networks, intranets, satellite networks, other computer networks such as voice or data mobile phone communication networks, and combinations thereof. The data processing system 105 of the environment 100 can communicate via the network 110, for instance with at least one content publisher 115 and at least one content provider 175 and at least one client device 120. The network 110 may be any form of computer network that relays information between the client device 120, data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The client device 120 may communicate wirelessly (e.g., via WiFi, cellular, radio, etc.) with a transceiver that is hardwired (e.g., via a fiber optic cable, a CAT5 cable, etc.) to other computing devices in the network 110. The client device 120 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions.

The content publisher 115 can include servers or other computing devices operated by a content publishing entity to provide one or more information resources (e.g., webpages) including primary content for display at the client devices 120 via the network 110. For instance, the content publisher 115 can include a web page operator who provides primary content for display on the web page. The one or more information resources can include content other than that provided by the content providers 175, and the web page can include content slots configured for the display of content items from the content providers 175. For instance, the content publisher 115 can operate the website of a company and can provide content about that company for display on web pages of the website. The web pages can include content slots configured for the display of third party content items of the content providers 175. In some implementations, the content publisher 115 includes a search engine computing device (e.g. server) of a search engine operator that operates a search engine website. The primary content of search engine web pages (e.g., a results or landing web page) can include results of a search as well as third party content items displayed in content slots such as content items from the content providers 175. The functionality of the content publisher 115 in the context of environment 100 will be explained below.

The content provider 175 can include servers or other computing devices operated by a content provider entity to provide content items 160 for display on information resources at the client devices 120. The content provided by the content provider 175 can include third party content items 160 for display on information resources, such as an information resource that includes primary content, e.g. content provided by the content provider 175. The content items 160 can also be displayed on a search results web page. For instance, the content provider 175 can provide or be the source of ads or other content items 160 for display in content slots of information resources, such as a web page of a company where the primary content of the web page is provided by the company, or for display on a search results landing page provided by a search engine. The content items 160 associated with the content provider 175 can be displayed on information resources other than web pages, such as content displayed as part of the execution of an application on a smartphone or other client device 120. The functionality of the content provider 175 in the context of environment 100 will be explained below.

The client device 120 can be a computing device configured to communicate via the network 110 to display data such as the content provided by a content publisher 115 (e.g., primary webpage content or other information resources) and the content provided by a content provider 175 (e.g., content items configured for display in an information resource). The client device 120 can be a desktop computers, laptop computers, tablet computers, smartphones, personal digital assistants, mobile devices, consumer computing devices, servers, clients, digital video recorders, a set-top box for a television, a video game console, or any other computing device configured to communicate via the network 110, among others. The client device 120 can be a communication device through which an end user can submit requests to receive content. The requests can be requests to a search engine, and the requests can include search queries. In some implementations, the requests can include a request to access a webpage.

The client device 120 can include a processor and a memory, i.e., a processing circuit. The memory stores machine instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 120 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 120 (e.g., a built-in display, microphone, etc.) or external to the housing of the client device 120 (e.g., a monitor connected to the client device 120, a speaker connected to the client device 120, etc.). In some implementations, the client device 120 may include an electronic display, which visually displays webpages using webpage data received from one or more content sources and/or from the content publisher 115 or the content provider 175 via the network 110.

The content retriever 125 can identify at least one static content item 160A to which to add interactivity. The static content item 160A can be associated with one of the content providers 175. The static content item 160A can be a content item with minimal interactivity, and include static visual content such as text, images, audio, or video and a script to direct the client device 120 to a landing page in response to an interaction thereon. In some implementations, the content retriever 125 can access the database 155 to retrieve the static content item 160A. In some implementations, the content retriever 125 can identify the static visual content to be included in the static content item 160A. The identification of the static visual content may be opposed to identification of the entire static content item 160A itself. In some implementations, the content retriever 125 can identify the static content item 160A automatically, without any command or request to add interactivity to the static content item 160A.

In some implementations, the content retriever 125 can receive a request to include interactivity into static content from the content provider 175. In some implementations, the request may be generated and sent by the content provider 175 using a graphical user interface for a content placement platform associated with the data processing system 105. The graphical user interface can include a user interface triggering a request to include interactivity to the static content item 160A. For example, the graphical user interface may be used to upload the static content item 160A to the data processing system 105. The graphical user interface can include a prompt with an option (e.g., corresponding to a radio button) to include interactivity to the static content item 160A. Once the option is selected, the content provider 175 can send the request to add interactivity to the static content item 160A. In some implementations, the content retriever 125 can receive one or more static content items 160A included in the request. In some implements, the content retriever 125 can retrieve the visual content 180 of each static content item 160A as part of the request. The request can include the desired type of interactivity (e.g., puzzle game, other type of interactivity, etc.).

The request received by the content retriever 125 can be the start of an interactive content generation pipeline, which can convert static content assets provided by the content provider 175 into interactive content items. Each of the techniques described herein with regard to the data processing system 105 or any of its components (e.g., the content retriever 125, the content divider 130, the content packager 135, the interaction predictor 140, the template selector 145, the performance monitor 150, the content items 160A-B, the template 165, and the script libraries 170) can be performed with minimal (e.g., only a single request providing static content) input from the content provider 175. In this manner, interactive can be added to static content without manual or strenuous efforts on the part of the content provider 175.

In some implementations, upon receiving a static content item 160A (or the visual content therein) from the content provider 175, the content retriever 125 can store the static content item 160A in the database 155. In some implementations, the request can include information identifying a static content item 160A in the database 155 (e.g., a URL address to the static content item 160A or the visual content 180). Upon receipt of information identifying a static content item 160A, the content retriever 125 can access the database 155 to retrieve the static content item 160A. In some implementations, the content retriever 125 can receive target device information included in the request. For example, the request can include information indicating that the interactive content will be provided to a device with a predetermined screen resolution.

Figure 1B:
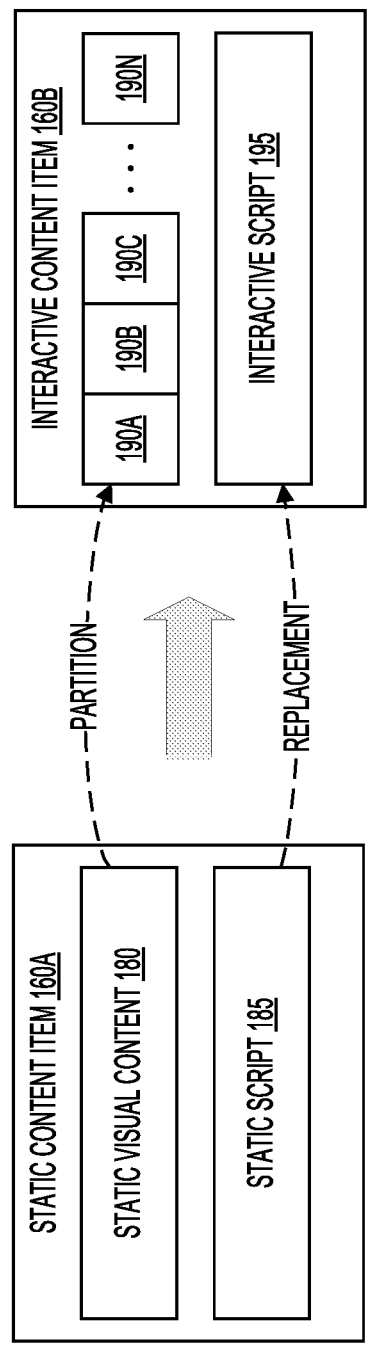
FIG. 1B shows a diagram depicting an example conversion from a static content item to an interactive content item.

Referring now to FIG. 1B, a diagram depicts an example conversion from a static content item 160A to an interactive content item 160B. The static content item 160A may include static visual content 180. The static visual content 180 can include, for example, an image, a video, or text, among others. The static visual content 180 can be associated or attributed with one or more parameters, for example size (e.g., dimensions of image or video), descriptive keywords, estimated interaction rate, and/or content metadata, among others. The static visual content 180 can be drawn, rendered, or otherwise displayed in a frame. The frame can define a region in which content items can be provided. In some implementations, the frame can exist among other content, for example informational resources provided by the content publisher 115. The static content item 160A can include at least one static content script 185. In some implementations, the static content script 185 can open a landing page on the client device 120 in response to an interaction (e.g., a click, keypress, or screen touch) with the static content item 160A. The static content script 185 can cause the static visual content 180 of the static content item 160A to be rendered, animated, displayed, or otherwise presented. In some implementations, the static content script 185 can send information about the client device 120 to the content provider 175 or the content publisher 115. In some implementations, the static content script 185 can send interaction information about the static content item 160A to the content provider 175 or the content publisher 115. In some implementations, the static content script 185 may not provide a prompt to the client device 120. The static content script 185 may not enable interactivity with the static visual content 180 beyond directing the client device 120 to the landing page upon detection of input.

With the identification of the static content item 160A, the content retriever 125 can determine whether the static content item 160A is eligible for the addition of interactivity. To determine eligibility, the content retriever 125 can identify one or more parameters of the static content item 160A, such as the dimensions (e.g., height and width) of the static visual content 180. With the identification, the content retriever 125 can determine whether the parameters of the static content item 160A satisfy specified parameters to be eligible. For example, to be eligible, static visual content 180 may be specified to be within a certain range of widths and heights.

In some implementations, the content retriever 125 can determine eligibility of static content item 160A based on contents of the visual content 180 of the static content item 160A. For example, visual content 180 with a lot of text may not be eligible for an interactive content item, while visual content depicting an image without text may be eligible. In some implementations, the content retriever 125 can determine the eligibility of static content using a machine learning algorithm (e.g., a neural network, convolutional neural network, recurrent neural network, linear regression model, and sparse vector machine). The content retriever 125 can input one or more static content items 160A into the machine learning model, and receive an output signal from the model indicating that the static content is eligible for interactivity.

In some implementations, the content retriever 125 can determine the eligibility of the static content item 160A based on a target client device 120 on which the interactive content item 160B generated from the static content item 160A is to be displayed. The target client device 120 can correspond to a type of client device (e.g., smartphone, desktop, or laptop) to which interactive content item 160B is to be provided. Client devices 120 can have different display and input/output capabilities, and static content items 160A eligible for interactivity on one type of client device 120 may not be eligible for interactivity on another type of client device 120. The target client device 120 can be pre-defined in accordance with the display capabilities of the type of client device 120. For each type of client device 120 corresponding to the target client device 120, the content retriever 125 can determine whether the static visual content 180 is eligible. To be eligible for a certain type of client device 120, static visual content 180 may be specified to be within a certain range of widths and heights. In some implementations, the content retriever 125 can store an association of the target client device 120 with the static content item 160A onto the database 155, upon determining that the static content item 160A is eligible to for the type of client device 120.

If the static content item 160A is determined to be not eligible, the content retriever 125 (and the data processing system 105) can halt further processing of the static content item 160A, and the static content item 160A may be maintained. Otherwise, if the static content item 160A is determined to be eligible, the content retriever 125 (and the data processing system 105) can further process the static content item 160A to add interactivity to the static content item 160A. In some implementations, the content retriever 125 can store the static content item 160A onto the database 155 to be further processed for inclusion of interactivity. The processing of the static content item 160A is detailed herein below.

The template selector 145 can select one of a set of templates 165 from the database 155 based on the visual content 180 of the static content item 160A. Each template 165 can include at least one segmentation path defining the number of segments 190 to be formed, the shape of each segment 190, and the dimensions for each shape. In some implementations, the segmentation path can be a scalable vector graphics (SVG) path. The SVG path can define the borders of one or more segments 190. Each segment 190 can have a size, shape, and location. In some implementations, the template 165 can include instructions to divide the static visual content 180 into a predetermined number of equally sized shapes, each with a predetermined location. In some implementations, the template 165 can include instructions to divide the static visual content 180 into a predetermined number of inter-locking shapes (e.g., puzzle pieces), each with a predetermined location. In some implementations, the number of segments 190, and the size, dimensions, shape, and location of each segment 190 can be predetermined. In some implementations, the number of segments 190, and the size, dimensions, and location of each segment 190 can be determined dynamically by the template selector 145 based input from the content provider 175. For example, the content provider 175 can include in a request to generate interactive content the dimensions, location, shape, and size of the segments 190 in the template 165. The template 165 can be used by the content divider 130 to create one or more segments 190 from static visual content 180.

In some implementations, the template selector 145 can select the template 165 based on the dimensions of the visual content 180 (e.g., width and height). In some implementations, certain templates in the set of templates 165 can be applied to static visual content 180 with certain dimensions or size. The selection of the template 165 can be responsive to determining that the static content item 160A is eligible for the addition of interactivity. Each of templates 165 can be selected for static visual content 180 with a certain width or height. The template selector 145 can select a template 165 by comparing compatible width and height information of the static visual content 180 with the width and height of the template 165. If the width and height specifications of the template 165 are sufficiently similar to the width and height of the static visual content 180 (e.g., their respective differences are less than a predetermined threshold, such as within 10% difference), the template selector 145 can select the template 165. If the width and height are not sufficiently similar (e.g., more than 10% different), the template selector 145 can compare the parameters of a different template from the set of templates 165. In some implementations, the template selector 145 can select the template 165 based on the target client device 120 on which the interactive content item 160B will be displayed. For example, one template 165 may be optimized for a mobile device (e.g., a smartphone, tablet, etc.), while another template 165 may be optimized for a personal computing device (e.g., laptop, desktop computer).

In some implementations, to select one of the templates 165, the interaction predictor 140 can calculate, determine, or predict an interaction rate for each template 165 maintained on the database 155. The interaction rate can indicate the number of impressions (e.g., views, clicks, or other interactions) associated with the interactive content items 160B generated using a particular template 165. In some implementations, the interaction rate can represent an estimated click-through rate of an interactive content item 160B generated using a respective template 165. In some implementations, the interaction rate can represent an estimated view-through rate of an interactive content item 160B generated using a respective template 165. The interaction rate can be predicted based on the visual content 180 of the static content item 160A, the target platform for the interactive content item 160B, and/or the type of template 165. In some implementations, the interaction rate for each template 165 can be determined based on the number of segments 190 defined by each template 165. For example, a template 165 with many small segments 190 may have a lower interaction rate than a template 165 with few larger segments 190 if the target device is a type of mobile device (e.g., smartphone, tablet, e-reader, etc.).

In some implementations, the interaction predictor 140 can determine the interaction rate for a template 165 based on feedback from one or more client devices 120. The client feedback can be used to train an interaction model, which can be a machine learning model (e.g., linear regression, neural network, convolutional neural network, recurrent neural network, sparse vector machine, etc.). The client feedback can include the type of client device 120, the type of interaction (e.g., click, hover over, keypress, and touch screen) with the interactive content item 160B generated using the template 165, the duration of interaction, and whether the interactive content item 160B displayed on the client device 120 resulted in a visit to a landing page associated with the interactive content item 160B. The interaction predictor 140 can store the interaction rate of each template 165 in the database 155 at a location associated with the respective template 165. In some implementations, the interaction predictor 140 can determine an interaction rate for each type of client device 120 (e.g., smartphone, smart watch, tablet computer, laptop, personal computer, other computing device, etc.). The interaction predictor 140 can store the interaction rate for each client device 120 at a location in the database 155 associated with the corresponding template 165.

In some implementations, the template selector 145 can select the template 165 from the database 155 based on the corresponding interaction rate determined by the interaction predictor 140. The template 165 used to create an interactive content item 160B from the static content provided by the content provider 175 can impact the overall interaction rate of the interactive content item 160B. For example, certain templates 165 may have higher interaction rates on certain types of client devices 120. The template selector 145 can access the database 155 to determine the interaction rate of each template 165. In some implementations, the template selector 145 can select the template 165 with the highest interaction rate. In some implementations, the template selector 145 can select the template 165 with the highest interaction rate for a type of client device 120 (e.g., smartphone, tablet computer, laptop, personal computer, other computing device, etc.). For example, the template selector 145 can select the template 165 with the highest interaction rate on a smartphone.

With the selection, the content divider 130 can divide the visual content 180 of a static content item 160A into a number of segments 190A-N (hereinafter generally referred to as segments 190) in accordance with the selected partition template 165. Each of the segments 190 can include parameters that define the corresponding dimensions, shape, size, and position of the segment 190. Each segment 190 can have or be attributed with an original position corresponding to a portion of the visual content 180 that the segment 190 originates. The original position can define coordinates of a segment 190 as the segment 190 corresponds to the original static visual content 180. The coordinates of the segments 190 can be defined by the template 165, and can include an index position (e.g., in the form of (x,y)) or a pixel coordinate, among others. In some implementations, the original position of a segment 190 can correspond to the top-left corner of the segment 190 as defined by the template 165. In some implementations, the original position of a segment 190 can correspond to the center of the segment 190 as defined by the template 165. The content divider 130 can apply the instructions in the template 165 to the visual content 180 of the static content item 160A to generate one or more segments 190. For example, a template 165 can include an SVG path which can define the borders of one or more content shapes. Applying the SVG path to the static visual content 180 can slice the static visual content 180 into one or more segments 190 defined by the SVG path. The SVG path can be configured such that each segment 190 fits seamlessly with all other segments 190 in the template 165. In some implementations, the template 165 is configured such that the segments 190 do not fit together seamlessly, and instead include gaps between each segment 190.

In dividing the static visual content 180, the content divider 130 can determine a target position for each of the segments 190. For each segment 190, the content divider 130 can identify the original position as the target position. The one or more segments 190 can be assigned a target position based on the segment position included in the template 165. The target position can define a position (e.g., an index position or a pixel position) that each segment 190 of the interactive content item 160B can be present in to create a completion condition. The content divider 130 can store the segments 190 at a location in computer memory, for example the database 155. For example, a template 165 can include nine segments, with three rows of three equally sized square segments. Because the segments 190 are square in this example, each segment 190 may have an equal width and height. When the example template 165 is applied to static visual content 180, the static visual content 180 can be divided into nine equally sized segments, and each segment can include a unique portion of the static visual content 180, for example as in FIG. 2. The target position of each segment 190 can be assigned by the content divider 130 to each segment 190 based on the location of the respective segment immediately after applying the template 165 to the static visual content 180. In some implementations, the target position can be stored as two-dimensional coordinates. In some implementations, the target position can be stored as a relative position value from an original position in the static visual content 180 (e.g., top left corner). In some implementations, the target position for each segment 190 can be the relative location with respect to another segment 190 (e.g., the right edge of segment zero can border the left edge of segment one, etc.). The content divider 130 can store the target positions of each segment 190 in a data structure in computer memory, for example the database 155.

The content divider 130 can include additional visual elements to the static visual content 180. In some implementations, the content retriever 135 can add an overlay element to the static visual content 180 in response receive an indication to create an interactive content item. For example, the content retriever 135 can insert an edit specifying that the static visual content 180 or the segments 190 formed therefrom are initially obscured (e.g., by a digital cloud, or foggy animation, etc.) until it is cleared in response to user interaction. The content divider 130 can provide the content packager 135 with the static visual content 180 and the additional visual elements for packaging into an interactive content item 160B.

Figure 2:
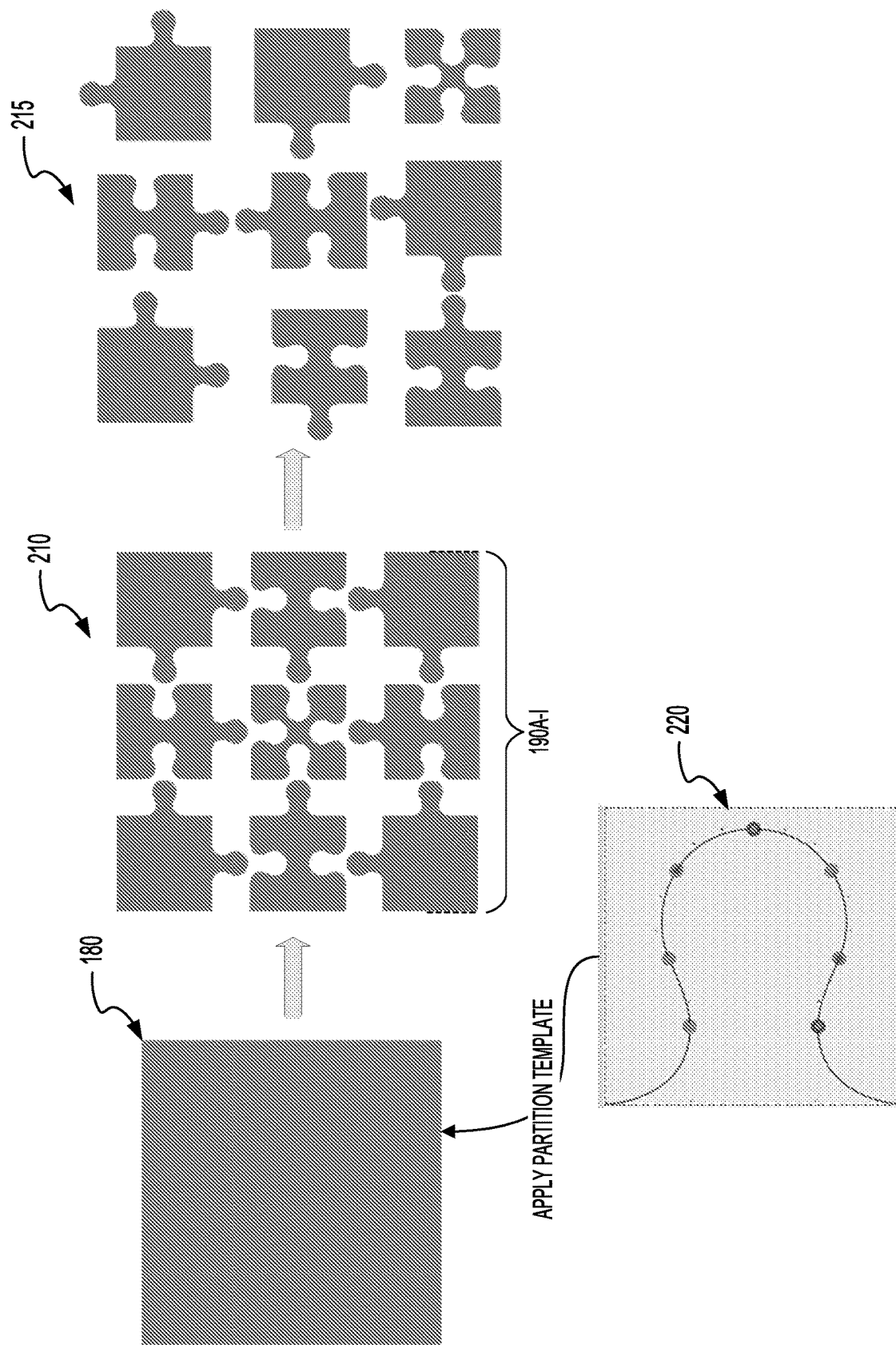
FIG. 2 shows a diagram illustrating an example division of a static content item in accordance with a partition template.

Referring now to FIG. 2, depicted is the division of static visual content 180 into segments 190 using a partition template 220 for incorporation into an interactive content item 160B. In the context of FIGS. 1A and 1B, the content divider 130 can use the partition template 220 (corresponding to one of the templates 165) selected by the template selector 145 to divide the static visual content 180 into nine segments 190A-I. The partition template 220 can include one or more SVG paths (e.g., as depicted) that can divide the static visual content 180 such that the segments 190 can be interlocking. At step 210, the content divider 130 can identify a target position each of the segments 190A-I as depicted located as the original position of the corresponding segment 190A-I. The target positions can be the location of the segments 190 following the division by the content divider 130. Although here it is depicted that the segments 190A-I appear in particular locations, it should be understood that the partition template 220 can designate the target positions of each segment 190, and that the segments 190A-I can appear in any location. At step 215, when the segments 190A-I are presented, the initially assigned positions of the segments 190 can be different from the original positions. For example, each segment 190 can be randomly assigned by a script to a position.

The content packager 135 can generate an interactive content item 160B to include the divided segments 190 from the visual content 180 and an interactive script 195 to replace the original static content script 185. In some implementations, the content packager 135 can generate an interactive content item 160B to include the static visual content 180 and an interactive script 196 to replace the original static script 185. The content packager 135 can generate the interactive script 195. The interactive script 195 can include instructions, which are executable by a computing device. For example, the interactive script 195 can include JavaScript, HTML5, PHP, or any other type of machine executable instructions. The interactive script 195 can also include metadata, for example metadata about the visual content 180, the size of the interactive content item 160B, or other metadata, among others. The metadata may be stored in a data structure, or in a specific format for maintaining metadata, for example JSON.

In some implementations, the interactive script 195 can download, cache, or otherwise access executable instructions, for example one or more script libraries 170. Each script library 170 provide one or more functions or instructions, which may be common to other operations with respect to the interactive script 195 executed by the client device 120. For example, the script libraries 170 can include JavaScript libraries, which can be included to enhance the functionality of JavaScript code. In addition, the script libraries 170 can include HTML5 libraries, which can be provided to extend the functionality of HTML5 code. In some implementations, the interactive script 195 can cache the one or more script libraries 170 retrieved from the database 155 in computer memory on the client device 120. In some implementations, the cached script libraries 170 can be accessed by one or more interactive content items 160B. For example, the interactive script 195 can access computer memory on the client device 120 to determine whether the script libraries 170 are resident on the client device 120. When the script libraries 170 are accessed via the client device 120, the interactive script 195 may provide interactivity with the segments 190, without providing separate instructions for the interactivity. In this manner, the file size of the interactive content item 160B may be reduced relative to separate applications that provide similar interactivity over graphical elements. As such, the amount of network bandwidth consumed in communicating the interactive content item 160B over the network 110 may be lessened relative to communication of such applications. In some implementations, the interactive script 195 can be read and executed by the client device 120 to which the interactive content item 160B is provided.

The content packager 135 can determine a file size specifications of the interactive content item 160B, and generate an interactive content item 160B such that the total size of the interactive content item 160B is less than or equal to the size specifications. In some implementations, the size specifications can be received from the content provider 175. In some implementations, the size specifications can be a predetermined value. By limiting the size of the generated interactive content item 160B, the content packager 135 can generate interactive content items 160B to match certain bandwidth specifications of computer networks, and provide additional control to the network resources to provide interactive content items 160B.

The content packager 135 can configure the interactive script 195 to assign each segment 190 of the static visual content 180 to a new position upon execution. The position for at least some of the segments 190 can be an initial position of each segment 190, which can be different than the target positions of each segment. The initial position can be the position at which the segments 190 are displayed after execution of the interactive script 195. This segments 190 can be moved from the initial positions to the target positions based on input to provide a prompt or other action by the interactive script 195. The initial positions of each segment 190 can be assigned to increase the overall interactivity of the interactive content item 160B. To reach a target condition, the interactive script 195 can be configured to define each of the segments 190 to be returned to the target positions. The content packager 135 can configure the interactive script 195 to assign at least some of the segments 190 to a location that is not equal or matching to an original position. The assigned position can maximize the interactivity of the content item (e.g., all of the segments 190 are to be interacted with to reach a target condition). In some implementations, the content packager 135 can configure the interactive script 195 to randomly assign each segment 190 (e.g., using a pseudo-number random generator) to a random position each time the interactive script 195 is executed by a client device 120.

In implementations where there are no segments 190 in the interactive content item 160B, the content packager 135 can configure the interactive script 195 to initially obscure the static visual content 180 included in the interactive content item 160B. The content packager 135 can obscure the static visual content 180 by rendering a fog effect over the static visual content 180, or by rendering some other image or animation in the foreground of the rendering pane where the interactive content item 160B is provided. In some implementations, the content packager 135 can configure the interactive script 195 to render a 'scratch off' surface, which can partially expose the static visual content 180 in response to one or more input events. For example, a swipe can expose the static visual content 180 where the coordinate position values of the interaction took place. In some implementations, the content packager 135 can implement one or more event listeners to determine the coordinates of interaction events. Based on the coordinates of the interaction events, the interactive script 195 configured by the content packager 135 can provide one or more animations at those coordinates, and expose portions of the static visual content 180.

The content packager 135 can configure the interactive script 195 to present a prompt via a user interface for initiation of interactivity with the interactive content item 160B. The prompt can be a small window or dialog box, which can appear in a frame in which the interactive content item 160B is rendered. The prompt or dialog box can include text reciting a request for interaction. The prompt can include one or more buttons, which can trigger the script to continue executing responsive to an interaction. In some implementations, the content packager 135 can configure the interactive script 195 to provide an option for interactivity and an option for static content. In some implementations, the prompt can include details of the nature of the interactive content item 160B (e.g., a puzzle game, or other type of interactive content, etc.). For example, the prompt can include instructions outlining the rules or goals for interaction with the interactive content item 160B, such as "Please complete the puzzle." In some implementations, the content packager 135 can configure the interactive script 195 to stall enablement of interacting with the segments 190 until an interaction with the prompt has been detected. In some implementations, responsive to detecting a selection of the option for interactivity from the prompt, the interactive script 195 can continue executing as described herein. Conversely, when the option for interactivity is not chosen, the interactive script 195 can cease execution. In some implementations, when the option for interactivity is not chosen, different kinds of content can be shown in lieu of the interactive content item 160B.

The content packager 135 can configure the interactive script 195 to display, render, or otherwise present the segments 190 of the interactive content item 160B. The presentation of the segments 190 can be in response to an interaction is detected with the presented prompt. The interactive script 195 can access graphical functionality from the client device 120 executing the interactive script 195. The graphical functionality can be used to render, draw, or otherwise visually display the segments 190 in a frame in which the interactive content item 160B is provided, for example in a web-page or native application. The frame can define a region in which third-party content may be displayed, for example static content items 160A or interactive content items 160B. The frame can include present boundaries (e.g., width and height) which can provide a limitation within which content items may be displayed. In some implementations, the frame has a fixed position among other content, for example informational resources provided by the content publisher 115. In some implementations, the frame may occupy the entire screen of the client device 120 (e.g., displayed in a full-screen mode). In some implementations, the frame can be dynamically provided in a media stream, for example in a video or other media content. The segments 190 of the interactive content item 160B can be rendered within the frame. In some implementations, the content packager 135 can configure the interactive script 195 to cause the segments 190 to render, draw, or otherwise visually display in a full-screen mode. In some implementations, the content packager 135 can configure the interactive script 195 such that it can present the segments 190 without user interaction with the prompt.

The content packager 135 can configure the interactive script 195 to present each segment 190 of the interactive content item 160B in the initially assigned position for the segment 190. Presenting the segments 190 of the interactive content item 160B can include rendering, drawing, or otherwise visually presenting each segment 190 at an initial position. The rendering of the segments 190 can be performed such that the segments 190 are presented within the frame providing the interactive content item 160B. In some implementations, the interactive script 195 can be configured by the content packager 135 to display the segments 190 to limit movement outside the boundaries defined by the frame for the interactive content item 160B. The content packager 135 can configure the interactive script 195 to randomly assign each of the segments 190 an initial position. In some implementations, the initial position of each segment 190 can be different from the target position of each segment 190. In some implementations, the initial position of one segment 190 can be the target position of another segment 190. In some implementations, presenting the segments 190 can include first rendering, drawing, or otherwise visually displaying each segment 190 at a target position, and then moving the segments 190 to an initial position after a predetermined amount of time, for example using an animation or other kind of motion. In some implementations, the content packager 135 can configure the interactive script 195 to present the segments 190 of the interactive content item 160B using animations, visual effects, or other additional visual features responsive to the segments 190 appearing at their respective initial positions.

The content packager 135 can configure the interactive script 195 to determine whether the segments 190 of the interactive content item 160B are in the respective target positions. The content packager 135 can configure the script to continuously monitor the position of each of the segments 190. During the assignment of an initial position to each segment 190, the interactive script 195 can compare the initial position of each segment 190 to the target position for the segment 190. If any of the segments 190 have an initial position which is equal to the target position of the respective segment 190, the interactive script 195 can be configured to reassign the initial position of that segment to another position. In some implementations, the content packager 135 can configure the interactive script 195 to reassign the initial positions of all segments if at least one segment has an initial position which is equal to its target position. The content packager 135 can configure the interactive script 195 to enable interaction with the segments 190 responsive to the determination that each of the segments 190 are in the respective initial positions and not in the target positions.

The content packager 135 can configure the interactive script 195 to enable interaction with the segments 190 of interactive content item 160B within the frame. With interaction enabled, each segment 190 can correspond to a user element of a graphical user interface corresponding to the interactive content item 160B. For example, each segment 190 can correspond to an HTML5 object of the interactive content item 160B, such as an inline frame, a command button object, and an image object, among others. The content packager 135 can configure the interactive script 195 to enable interaction with the segments 190 prior to determining that each of the segments 190 differ from the target position. In some implementations, the content packager 135 can configure the interactive script 195 to handle interactions with each segment 190.

In some implementations, the content packager 135 can configure the interactive script 195 to associate or include the event listener (e.g., drag listener) with each of the segments 190. For example, the content packager 135 can include event listeners for a mouse pointer or a touch-based interface into the interactive script 195 to cause the segment 190 interacted upon to move from one position to another position. The interaction with the segment 190 can include click input, touch input, and/or drag input, among others. The click input can be detected by one or more event listeners configured to detect clicks associated with the segments 190. Touch input can be detected by one or more event listeners associated with each segment, which can be configured to detect touch interactions with each of the segments 190. The drag listener can be configured by the content packager 135 to assign each segment 190 with a position based on a detected drag operation. The event listener associated with each segment 190 can be configured by the content packager 135 to identify a previous position and a next position in response to detection of the event. In some embodiments, when the event listener for a segment 190 detects an n interaction from the initial position of a segment to a new position, the interactive script 195 can be configured to move the segment 190 to the new position indicated by the event listener. In some implementations, the content packager 135 can configure the interactive script 195 to move a respective segment 190 if an interaction has been detected with the segment. For example, the content packager 135 can configure the interactive script 195 to enable dragging of each of the segments 190 responsive to touch and movement input from a touch screen.

Each time an interaction with one of the segments 190 is detected, the content packager 135 can configure the interactive script 195 to update rendering of the segments 190 to a position within the frame providing the interactive content item 160B indicated by the one or more event listeners (e.g., drag listeners). In some embodiments, when an interaction (e.g., a drag event) is detected by the event listener associated with a segment 190, the event listener can continuously provide a position of the interaction event as it occurs. The content packager 135 can configure the interactive script 195 to render the respective segment 190 in the position indicated by the event listener within the frame providing the interactive content item 160B, which can make the segment 190 appear to follow the interaction event detected at the client device 120. In some implementations, the content packager 135 can configure the interactive script 195 to render an animation in response to an interaction detected by the one or more event listeners. For example, if an interaction is detected with a segment 190, the content packager 135 can configure the interactive script 195 to render a glow animation, as in step 305C in conjunction with FIG. 3.

The content packager 135 can configure the interactive script 195 to determine whether the segments 190 of the interactive content item 160B have been moved to a respective target position. The determination of whether the segments 190 are moved to the respective target positions can be part of a determination by the interactive script 195 to determine whether a target condition is met. The target condition can specify that each segment 190 is to be moved from the initially assigned position to the target position. The content packager 135 can configure the interactive script 195 to continuously monitor the locations of each segment 190, and compare the location of each segment 190 to its respective target position. Through input received from the client device 120, each segment 190 can be moved to different locations. In some implementations, the content packager 135 can configure the interactive script 195 to perform a comparison between the position of each segment 190 and the respective target position responsive to user input. For example, the script may check for a position update if a segment 190 has been moved. In some implementations, the content packager 135 can configure the interactive script 195 to compare the positions of each segment 190 to a respective target position based on a predetermined time interval (e.g., ten times per second). The content packager 135 can configure the interactive script 195 to display an animation, visual effect, or other kind of visual indicator when a segment 190 is determined to be in a respective target position. In response to determining that the segments 190 are not moved to the respective target positions, the content packager 135 can configure the interactive script 195 to continue monitoring for interactions with the segments 190.

The content packager 135 can configure the interactive script 195 to perform an action in response to determining that the segments of static content have been moved to the respective target positions. In some implementations, the action of the interactive script 195 can include displaying a prompt with information related to the segments 190. The information may be provided by the content provider 175 or the content publisher 115. In some implementations, the action of the interactive script 195 can include directing the client device 120 a landing page (e.g., webpage, native application, etc.) in response to determining that all of the segments 190 are located at their respective target positions. The address of the landing page can be provided by the content provider 175. In some embodiments, the content packager 135 can identify the address of the landing page from the static content script 185 of the static content item 180A. In some implementations, the content packager 135 can configure the interactive script 195 to automatically open the address pointing to the landing page upon reaching the target condition.

In some implementations, the content packager 135 can configure the interactive script 195 to present a prompt via a user interface to provide information related to the interactive content item 160B. The presentation of the prompt may be one of the actions that can be performed in response to determining that the segments of static content have been moved to the respective target positions. In some implementations, the content packager 135 can configure the interactive script 195 to access native application interfaces present on the client device 120 to present the prompt via the user interface. In some implementations, the content packager 135 can configure the interactive script 195 to execute instructions to provide the user interface without relying on native application interfaces. For example, the content packager 135 can configure the interactive script 195 to display a pop-up window with customized graphical designs defining the prompt. The customized graphical designs can be included in the request for interactive content received by the content provider 175. In some implementations, the content packager 135 can configure the interactive script 195 to provide the prompt including information about the landing page associated with the interactive content item 160B (e.g., the title of the landing page, any parties associated with the landing page, the address of the landing page, a link to the landing page, etc.). In some implementations, the content packager 135 can configure the interactive script 195 to provide display a prompt including a request to open the address associated with the landing page associated with the interactive content item 160B. In some implementations, the content packager 135 can configure the interactive script 195 to open an application on the client device 120 responsive to an interaction with the prompt.

The content packager 135 can configure the interactive script 195 to provide the performance monitor 150 with interaction data. The interaction data can include the positions of each of the segments 190 and their respective current positions. The interaction data can also include the position of each segment 190 and their previous position before detection of an interaction with the segment 190. The content packager 135 can configure the interactive script 195 to provide the performance monitor 150 with an indication that an interaction has been detected by the one or more event listeners associated with the segments 190. In some implementations, the content packager 135 can configure the interactive script 195 to include a timer to count time in relation to interactions with one or more of the segments 190 of the interactive content item 160B. In some implementations, the interaction data may include a time data related to the interactions with one or more of the segments 190. The time data can include a time stamp of each interaction with the segments 190. The time data can also include an amount of time elapsed from detecting an interaction with the initial prompt.

In some implementations, the content packager 135 can provide the performance monitor 150 with interaction data. In some implementations, the content packager 135 can configure the interactive script 195 to provide the performance monitor 150 with interaction data at a predefined interval. For example, the content packager 135 can configure the interactive script 195 to transmitting all stored interaction data in a burst to the performance monitor 150. The interaction data may be used, for example, to track how many of the segments 190 have been moved to their respective target positions.

The content packager 135 can configure the interactive script 195 to provide the performance monitor 150 with interaction data subsequent to satisfying the target condition (e.g., all the segments 190 are at their respective target positions). In some implementations, the content packager 135 can configure the interactive script 195 to provide an indication as to whether the target condition to the performance monitor 150. The indication may be part of the interaction data. In some implementations, the time data of the interaction data can include a time from start to detecting the satisfaction of the target condition. In some implementations, the content packager 135 can configure the interactive script 195 to provide an indication as to whether an interaction with the prompt is detected subsequent to the target condition. The indication may be part of the interaction data transmitted to the performance monitor 150. In some implementations, the time data of the interaction data can include a time stamp of the interaction with the prompt.

With the generation of the interactive script 195, the content packager 135 can package or add the interactive script 195 with the segments 190 to create the interactive content item 160B. In some implementations, the interactive content item 160B can be an HTML5 bundle with an interactive content item 160B script. The interactive content item 160B script can be JavaScript, and can include one or more script libraries 170, for example the script libraries 170. In some implementations, the content packager 135 can obfuscate the interactive script 195 (e.g., by encryption). In some implementations, the content packager 135 can configure the interactive script 195 to automatically download and cache one or more of the script libraries 170 responsive to the execution of the interactive script 195 on the client device 120. The interactive content item 160B can be accessed by one or more content publishers 115, which can provide the interactive content item 160B to one or more client devices 120. In some implementations, the content packager 135 can apply a compression algorithm to the segments 190 and/or the interactive script 195 to reduce network bandwidth utilization.

The content packager 135 can provide the interactive content item 160B to one or more client devices 120 via the network 110. The content packager 135 can provide the interactive content item 160B responsive to a request from a respective client device 120. For example, the content publisher 115 can provide an information resource (e.g., a webpage) to a client device 120 (e.g., an application such as a web browser). The information resource can include at least one content slot (e.g., an inline frame) to which additional content from one of the content providers 175 is to be inserted. The information resource can include a script, the execution of which can cause the client device 120 to send a request for content to the data processing system 105. Upon receipt of the request, the content packer 135 can send the interactive content item 160B to the client device 120 via the network 110. In sending the content, the content packager 135 can run a content selection process to find and select the interactive content item 160B. The interactive content item 160B sent to the client device 120 can include the one or more segments 190 and the interactive script 195. In some implementations, the content packager 135 can provide an address (e.g., a URL address referencing the content provider 175) to the interactive content item 160B to the client device 120. In some implementations, the content packager 135 can provide an address to each segment 190 (or one or more of the segments 190) to be included in the interactive content item 160B. In some implementations, the content packager 135 can provide an address to the interactive script 195 to provide interactive functionality to the segments 190 of the interactive content item 160B.

In some implementations, upon receiving the request for an interactive content item 160B, the data processing system 105 can select an interactive content item 160B based on one or more selection factors. The selection can be in accordance with a content placement process. The selection factors can include information about the client device 120, for example the type of device (e.g., smartphone, tablet, laptop computer, personal computer, etc.), the type of application requesting the content item, the screen resolution of the client device 120, the size of the frame included in the information resources, and other any other factors related to the display or delivery of content items. After selecting the appropriate interactive content item 160B based on the selection factors, the data processing system 105 can transmit the interactive content item 160B to the client device 120 for display in the content slot (or frame) included in the information resources.

In some implementations, the content packager 135 can provide the interactive content item 160B based on the type of client device 120 from which the request for content is received. The content packager 135 can identify the type of client device 120 (e.g., smartphone, laptop, set-top box, or desktop). The content packager 135 can determine whether the type of the client device 120 associated with the request matches the target client device 120 for the static content item 160A determined as eligible for addition of interactivity. In some implementations, the content packager 135 can access the database 155 to identify the association of the target client device 120 to the static content item 160A determined to be eligible for the type of client device corresponding to the target. When there is a match, the content packager 135 can provide the interactive content item 160B to the client device 120. Otherwise, when there is no match, the content packager 135 can search for another content item (e.g., the corresponding static content item 160A) to provide.

With the transmission of the interactive content item 160B from the data processing system 105, the client device 120 can receive the interactive content item 160B. Upon receipt, the client device 120 (or an application running on the client device 120) can parse the interactive content item 160B to identify the interactive script 195 and the segments 190. In some implementations, the client device 120 can identify the address for the interactive content item 160B received from the data processing system 105, and can retrieve the interactive content item 160B using the address (e.g., from the content provider 175). In some implementations, the client device 120 can identify the address for one or more segments 190, and can retrieve the segments 190 using the address. In some implementations, the client device 120 can the address for the interactive script 195 provided by the data processing system 105, and can retrieve the interactive script 195 using the address.

Upon parsing the interactive script 195 and the segments 190 from the interactive content item 160B, the client device 120 (or the application running on the client device 120) can insert the interactive content item 160B into the content slot of the information resource. The client device 120 can also invoke and execute the functionalities specified in the interactive script 195. The functionalities of the interactive script 195 can be separate from the functionalities of the information resource on which the interactive content item 160B is inserted. Furthermore, the client device 120 can load the interactive script 195 and the segments 190 to a location in computer memory. The computer memory of the client device 120 can be accessible to the application (e.g., a web browser) providing the information resource. In some implementations, the loading process for the interactive content item 160B can include requesting and downloading one or more script libraries 170.

With the invocation of the interactive script 195, the client device 120 can perform the instructions as specified by the interactive script 195. The client device 120 can show, render, or otherwise display the segments 190 extracted from the interactive content item 160B with the content slot of the information resource. As the interactive content item 160B is inserted into one of the content slots of the information resource, the functionalities of the interactive script 195 may be constrained to the boundaries of the frame corresponding to the content slot. In some implementations, the segments 190 can be displayed in their initial positions. For example, the segments 190 can be displayed in their target positions and automatically moved to their initial positions.

Furthermore, the client device 120 can enable interaction with the segments 190 through event listeners in accordance with the interactive script 195. For example, using a mouse-drag event listener associated with one of the segments 190, the client device 120 can detect a drag-and-drop event on the segments 190. The event listener associated by the interactive script 195 to each segment 190 can be constrained by the boundaries of the frame corresponding to the content slot of the information resource into which the interactive content item 160B is inserted. As such, interactions outside the boundaries of the content slot may not affect or trigger any of the event listeners of the interactive script 195 associated with the segments 190 of the interactive content item 160B. In response to the detection of the event, the client device 120 can identify a final position of the interaction and render the segment 190 moved from the initially assigned position to the final position. The client device 120 can continue to execute the interactive script 195 until a target condition has been reached. The target condition can occur or be detected in response to the segments 190 being moved to their respective target positions.

As the interactive script 195 is executing, the client device 120 can send an interaction data to the data processing system 105. For example, the interaction data can include the positions of each of the segments 190 and their respective current positions. In addition, the interaction data can include a time stamp for each interaction with the segments 190. The client device 120 can execute the script to present a prompt in response to the target condition. For example, upon reaching the target condition, the client device 120 can present a message box with the text "click here to download application." The client device 120 can send additional interaction data indicating whether an interaction with the prompt was detected. The time data of the interaction data can include an amount of elapsed time to the detection of the target condition.

Figure 3:
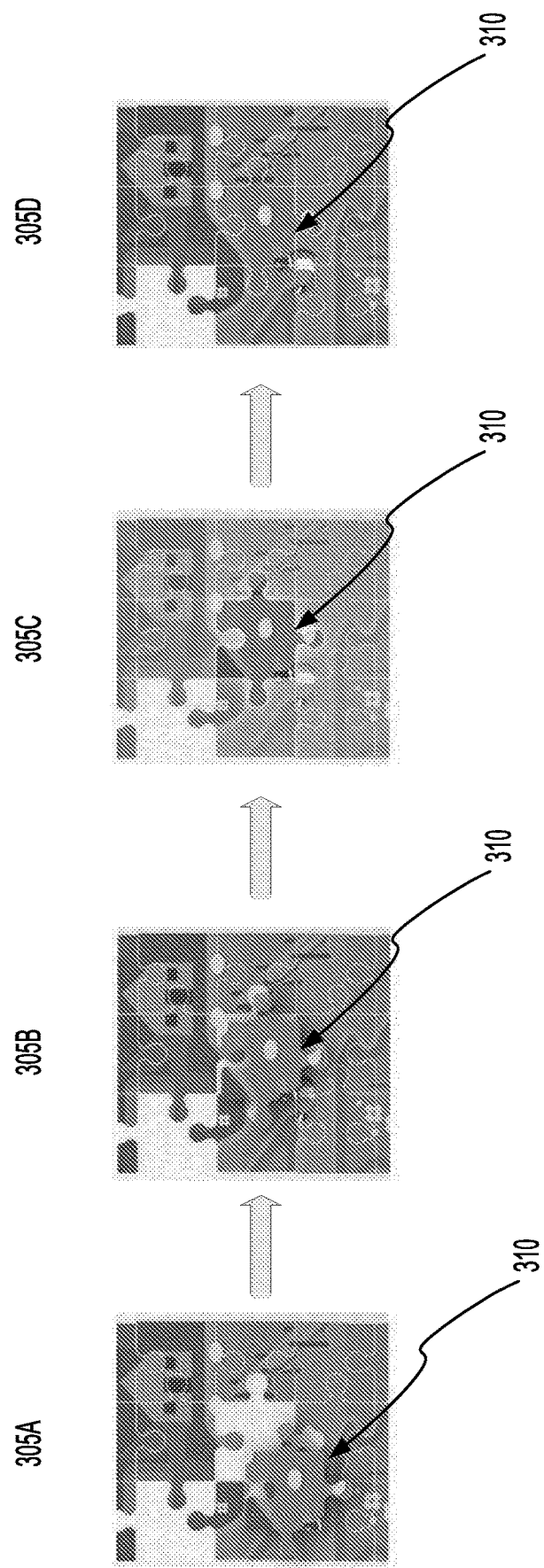
FIG. 3 shows a diagram illustrating an example of an interaction with the interactive content item.

Referring to FIG. 3, depicted is an example illustration of an interaction with an interactive content item 160B. At step 305A, the client device 120 may have rendered the segments (e.g., segments 190) of an interactive content item. The segments 310 may not be at the respective target position. At step 305B, the client device has received input indicating an interaction with the segment 310. In this example, the interaction is a drag event detected by the interactive script (e.g., interactive script 195) executing on the client device 120. The position of the segment 310 may have been changed to correspond to the drag event. At step 305C, the segment 310 may have been moved to its respective target position by the drag event detected by the client device. The client device 120 can provide an animation, illustrated here as a glow animation, in response to the segment 310 reaching the respective target position. In some implementations, the animation may be temporary. In some implementations, the client device 120 can maintain the position of the segment 310 after the segment 310 has been moved to the target position. At step 305D, the animation has stopped and the segment 310 may be no longer glowing. The segment 310 may have reached the target position and is rendered by the client device as interlocking with the other segments.

Subsequent to the provision of the interactive content item 160B to the client device 102, the performance monitor 150 can receive interaction data from the client devices 120. The interaction data can indicate a position of each segment 190. In some implementations, the interaction data can indicate whether the segments 190 have been moved to the target position. In some implementations, the performance monitor

150 can receive interaction data from a respective client device in response to detection of an interaction with one of the segments 190. The interaction data can be provided in accordance with the interactive script 195 running on the client device 120. For example, the interaction data can include interactions that correspond to each of the segments 190. The interaction data can specify a previous position and a subsequent position for each segment 190 in response to an interaction detected by the event listener associated with segment 190. The interaction data can also include a time stamp of each interaction. In some implementations, the interaction monitor can receive the interaction data in real-time (e.g., as the interactions occur on a client device 120, the interaction data is transmitted to and received by the performance monitor 150). In some implementations, the performance monitor 150 can receive interactive data at intervals. In some implementations, the interaction data can be received periodically based on a predetermined time interval (e.g., ranging from 10 seconds to 5 minutes).

Furthermore, the performance monitor 150 can receive interaction data from the client device 120 subsequent to all the segments 190 reaching the respective target positions. In some implementations, the interaction data can include an indication that the client device 120 has visited the landing page associated with the interactive content item 160B. In some implementations, the interaction data can include an indication of whether an interaction with a prompt provided by the interactive script 195 is detected at the client device 120. The indication may be part of the interaction data, and can include time data in relation to the interaction with the prompt. In some implementations, the performance monitor 150 can receive an indication that all segments 190 have reached their corresponding target positions. The indication may be part of the interaction data, and can include time data, such as time elapsed to reaching the target condition.

Figure 4:
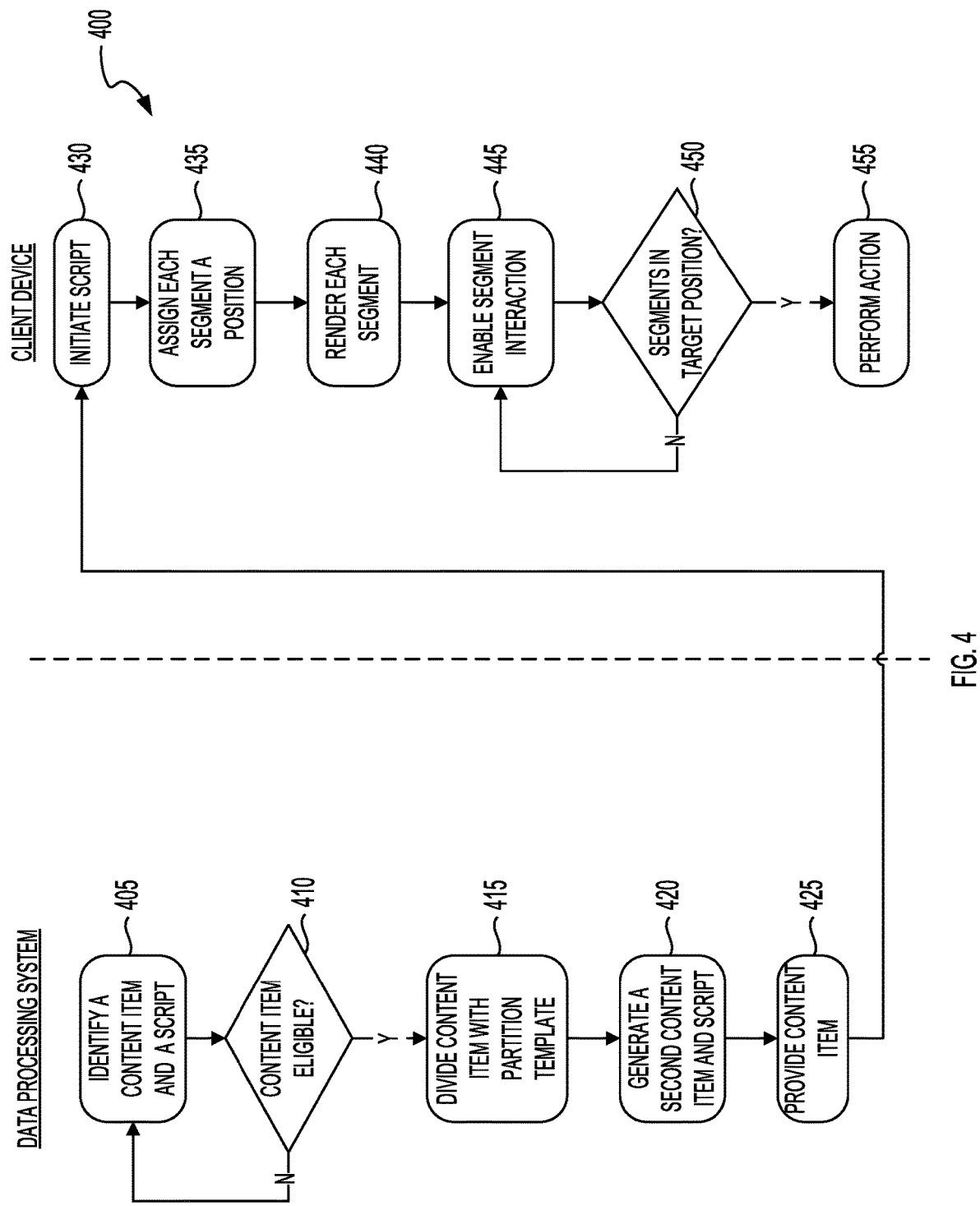
FIG. 4 shows a flow diagram of an example method of converting static content items into interactive content items.

Referring now to FIG. 4, depicted is a flow diagram of a method 400 for generating an interactive content item including a script and executing the script on a client device. The method 400 can be implemented or performed using the data processing system 105 in conjunction with at least one client device 120 detailed herein above, or the computer system 500 described herein below in conjunction with FIG. 5. In brief overview, a data processing system can identify a content item and a script (405). The data processing system can determine whether the content item is eligible (410). The data processing system can divide the content item using a partition template (415). The data processing system can generate a second content item and script (420). The data processing system can provide the content item to a client device (425). The client device can initiate the script from the content item (430). The client device can assign each segment a position (435). The client device can render each segment (440). The client device can enable segment interaction (445). The client device can determine whether the segments are in their respective target positions (450). The client device can perform an action (455).

The data processing system (e.g., the data processing system 105) can identify a content item (e.g., the static content item 160A) (405). The content item can include visual content (e.g., the visual content 180). The visual content can include images, video, and text, among others. The visual content can be associated or attributed with one or more parameters, for example dimension (e.g. width and height), encoded information, descriptive text strings, or other metadata, among others. The content item can include a script (e.g. static content script 185). In some implementations, the data processing system can extract the visual content, along with its one or more parameters, from the content item for further processing. In some implementations, the data processing system can receive the visual content and the one or more parameters from a content provider (e.g., content provider 175).

The data processing system can determine whether the content item is eligible (410). In some implementations, the data processing system can determine eligibility based on the size (e.g., width and height) of the visual content. For example, the data processing system can compare the width and height of the visual content to predetermined thresholds. In some implementations, if the width and/or height of the content item exceeds one or more of the predetermined thresholds, the data processing system can determine that the content item is ineligible. If the width and height of the content item are within the one or more predetermined thresholds, the data processing system can determine the visual content to be eligible. In some implementations, the predetermined thresholds are selected based on the target platform for the interactive content item. For example, the target platform may have a specific screen resolution that defines its own predetermined thresholds for the width and height of content items. If the data processing system determines the visual content to be eligible, the data processing system can proceed to divide the visual content in step (415). If the data processing system determines that the content item is not eligible, the data processing system can return to step (405) to identify different visual content.

The data processing system can divide the visual content of the content item using a partition template (e.g., template 165) (415). Dividing the visual content item can include selecting a partition template. In some implementations, the partition template can include one or more SVG paths. The SVG paths can define the borders, shapes, and/or sizes of segments (e.g., the segments 190) to be created using the visual content identified in step (405). The template can include a target position for each segment. The data processing system can create the one or more segments by applying the partition template to the visual content. Applying the partition template can include dividing the visual content along the SVG paths included in the partition template. In some implementations, each of the divided segments can interlock with other segments of the divided visual content to form an image, video, or other visual representation associated with the visual content (e.g., a puzzle).

The data processing system can generate an interactive content item and script (420). The data processing system can generate a script to add interactivity to the divided segments generated in step (415). In some implementations, generating the script can include configuring the script to enable movement of the segments in response to input events received from the computing device executing the script. The input events can be touch input or mouse movement input, among others. In some implementations, the script can be configured to randomly assign each of the segments a random (e.g., pseudo-random) position which is not equal to its respective target position. In some implementations, the script can be configured to render the one or more segments within a frame, and present them for interactivity. In some implementations, the script can be configured to provide a prompt indicating that the content within the frame is interactive. In some implementations, the script can be configured to provide interaction data to the data processing system. The data processing system can package the script and the one or more segments to create an interactive content item (e.g., interactive content item 160B). The interactive content item can be implemented, for example, as an HTML5 bundle which can include JavaScript. In some implementations, the data processing system can generate the interactive content item such that it is within a certain predetermined size specification (e.g., two megabytes).

The data processing system can provide the interactive content item (425). The data processing system can provide the interactive content item to at least one client device (e.g., one of the client devices 120). The data processing system can transmit the content item via a computer network (e.g., network 110). In some implementations, the interactive content item can be displayed in one or more frames on the client device. In some implementations, the client device can extract the segments and the script from the interactive content item in response to receiving the interactive content item from the data processing system.

The client device (e.g., one of the client devices 120) can initiate the script (430). Initiating the script can include allocating buffers for the one or more segments in computer memory. In some implementations, initiating the script can include downloading one or more script libraries (e.g., script libraries 170) from the data processing system. Downloading the script libraries can include allocating storage for the script libraries. The client device can cache the script libraries in a location in computer memory in response to receiving the script libraries from the data processing system. The client device can begin executing the script in response to storing or caching the script libraries, and/or storing the segments in computer memory.

The client device can assign each segment an initial position (435). The position can be assigned randomly (e.g., using pseudo-random number generator) by the script included in the interactive content item. In some implementations, the segments can be assigned a position which is different from its respective target position. The target position of each segment can be defined by the partition template used to create the segments. In some implementations, the partition template can assign each of the segments an initial position. The client device can determine whether each of the segments is assigned an initial position which is different from its respective target position. If the client device determines that the initial position of a segment is the same as the target position of the segment, the client device can assign that segment a new initial position, for example using a pseudo-random number generator.

The client device can present each segment (440). The client device can present each segment by accessing one or more display functions of the client device. The client device can present each segment within a frame. The frame can specify boundaries for the interactive content item and the segments, and can include a predetermined width, height, and location for rendering the segments of the interactive content item therein. In some implementations, the frame can be included in informational resources provided by a content publisher (e.g., content publisher 115). In some implementations, the client device can render the one or more segments of the interactive content item at their respective initial positions. In some implementations, the client device can render the one or more segments of the interactive content items at their respective target positions, and then visually move the segments to their respective initial positions. In some implementations, presenting each segment can include providing an animation including the segments.

The client device can enable interaction with each segment (445). The client device can begin monitoring for input from an input device (e.g., mouse pointer, touch based input, etc.) to determine if the input includes an interaction with one or more of the segments presented in step (435). In some implementations, the client device can move the one or more segments to a new position in response to input from an input device. For example, if the input includes a click-and-drag of one of the segments, the client device can move the segment to the position indicated by the input device. In some implementations, the client device can provide an animation in response to the input.

The client device can determine whether each segment is in a target position (450). In some implementations, the client device can continuously monitor the position of each segment. In some implementations, the client device can monitor the position of each segment in response to an input event (e.g., mouse click, touch based input, etc.). The client device can compare the position of each segment to its respective target position. In some implementations, if the client device determines that the position of a segment is equal to its target position, the client device can provide an animation indicating that the segment has reached its target position. In some implementations, if the client device determines that a segment has reached its target position, the client device can disable interaction with that segment. The client device can send interaction data, including the positions of each segment, to the data processing system in response to a segment being moved to its target position. If the client device determines that all segments have been moved to their target positions, the client device can perform an action as in step (450). If the client device determines that all segments have not been moved to their respective target positions, the client device can continue to enable interaction with the segments as in step (445).

The client device can perform an action (455). In some implementations, the client device can perform an action in response to all segments being moved to their respective target positions. In some implementations, the action can include presenting a prompt on the client device indicating that all segments have been moved to their respective target positions. In some implementations, the prompt can include a link to a landing page, or other information related to the interactive content item. The client device can open an address to a landing page. For example, the client device can open up an address to a landing page related to the interactive content item using a web browser. In some implementations, the client device can open the address to the landing page in a native application executed on the client device. In some implementations, the action can include providing an indication to the data processing system that all segments have been moved to their respective target positions. The indication can include data that indicates a prompt has been presented on the client device. The client device can provide interaction data to the data processing system, including an indication that a landing page has been opened on the client device, in response to the landing page being opened on the client device.

FIG. 5 shows the general architecture of an illustrative computer system 500 that may be employed to implement any of the computer systems discussed herein in accordance with some implementations. The computer system 500 can be used to provide information via the network 110 for display. The computer system 500 of FIG. 5 comprises one or more processors 520 communicatively coupled to memory 525, one or more communications interfaces 805, and one or more output devices 510 (e.g., one or more display units) and one or more input devices 515. The processors 520 can be included in the data processing system 105 or the other components of the system 500.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 500 of FIG. 5, the data processing systems can include the memory 525 to store information related to the sets of user identifiers, the generated vectors, among others. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 800 to transmit information to or receive information from other devices (e.g., other computer systems). While not shown explicitly in the system of FIG. 5, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 105.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content, which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing systems 105 can include clients and servers. For example, the data processing systems 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
    selecting, by a data processing system including one or more processors, visual content identifying a content provider, wherein the content provider provides third party content, for a first content item including a first script, the first script configured to present the visual content responsive to loading of the first content item;
    dividing, by the data processing system in accordance with a partition template, the visual content of the first content item into a plurality of segments, the partition template defining a number of segments to be formed from the visual content, a shape for each segment of the plurality of segments, and dimensions for each shape, each segment of the plurality of segments corresponding to a differing portion of the visual content;
    generating, by the data processing system, a second content item to include the plurality of segments to be presented within a frame of an information resource provided by a content publisher, wherein the content publisher provides primary content on the information resource, and a second script, the second script configured to:
        assign, responsive to loading of the second content item, each segment of the plurality of segments into one of a plurality of positions, each position of the plurality of positions defining a region within the frame at which the segment is to be presented;
        present the plurality of segments within the frame in accordance with the plurality of positions assigned to each segment of the plurality of segments;
        enable, via interaction, movement of each segment of the plurality of segments among the plurality of positions within the frame;
        determine, responsive to detection of an interaction with one of the plurality of segments, that the plurality of segments are moved from the plurality of positions to a target plurality of positions; and
        open, responsive to determining that the plurality of segments are moved to the target plurality of positions, a landing page provided by the content provider; and
    providing, by the data processing system, the second content item to a client device to cause the client device to present the plurality of segments in accordance with the second script.

2. The method of claim 1, further comprising selecting, by the data processing system, the partition template from a plurality of partition templates based on visual content of the first content item, and
    wherein dividing the visual content further comprises dividing the visual content into the plurality of segments in accordance with the partition template, responsive to selecting the partition template from the plurality of partition templates.

3. The method of claim 1, further comprising:
    determining, by the data processing system, for each partition template of plurality of partition templates, a predicted interaction rate with the visual content divided in accordance with a corresponding partition template; and selecting, by the data processing system, the partition template from the plurality of partition templates based on the predicted interaction rate determined for each partition template of the plurality of partition templates, and wherein dividing the visual content further comprises dividing the visual content into the plurality of segments in accordance with the partition template, responsive to selecting the partition template from the plurality of partition templates.

4. The method of claim 1, further comprising determining, by the data processing system, that the first content item is eligible for addition of interactivity based on the visual content of the first content item, and wherein dividing the visual content further comprises dividing the visual content into the plurality of segments in accordance with the partition template, responsive to determining that the first content item is eligible.

5. The method of claim 1, further comprising identifying, by the data processing system, an initial plurality of positions for the plurality of segments as the target plurality of positions, each position of the initial plurality of positions defining a region within the visual content of the first content item from which the segment is taken; and wherein generating the second content item further comprises generating the second content item to include the second script configured to determine, responsive to detection of the interaction with one of the plurality of segments, that the plurality of segments are moved from the plurality of positions to the initial plurality of positions.

6. The method of claim 1, wherein generating the second content item further comprises generating the second content item to include the second script configured to:

present a prompt for initiation of interactivity with the second content item within the frame; and present, responsive to detecting an interaction with the prompt, the plurality of segments within the frame in accordance with the plurality of positions.

7. The method of claim 1, wherein dividing the visual content of the first content item further comprises dividing the visual content into the plurality of segments in accordance with the partition template, the partition template including a segmentation path to define the number of segments to be formed, the shape for each segment of the plurality of segments, and the dimensions for each shape.

8. The method of claim 1, wherein selecting the first content item further comprises receiving, from a content provider, a request to include interactivity into content, the request including the first content item.

9. The method of claim 1, further comprising receiving, by the data processing system, from the client device responsive to opening the landing page, an indication that the plurality of segments are moved to the first plurality of positions.

10. A system comprising:

a data processing system including one or more processors, the data processing system configured to:

select visual content identifying a content provider, wherein the content provider provides third party content, for a first content item including a first script, the first script configured to present the visual content responsive to loading of the first content item;

divide, in accordance with a partition template, the visual content of the first content item into a plurality of segments, the partition template defining a number of segments to be formed from the visual content, a shape for each segment of the plurality of segments, and dimensions for each shape, each segment of the plurality of segments corresponding to a differing portion of the visual content;

generate a second content item to include the plurality of segments to be presented within a frame of an information resource provided by a content publisher, wherein the content publisher provides primary content on the information resource, and a second script, the second script configured to:

assign, responsive to loading of the second content item, each segment of the plurality of segments into one of a plurality of positions, each position of the plurality of positions defining a region within the frame at which the segment is to be presented;

present the plurality of segments within the frame in accordance with the plurality of positions assigned to each segment of the plurality of segments;

enable, via interaction, movement of each segment of the plurality of segments among the plurality of positions within the frame;

determine, responsive to detection of an interaction with one of the plurality of segments, that the plurality of segments are moved from the plurality of positions to a target plurality of positions; and open, responsive to determining that the plurality of segments are moved to the target plurality of positions, a landing page provided by the content provider; and provide the second content item to a client device to cause the client device to present the plurality of segments in accordance with the second script.

11. The system of claim 10, wherein the data processing system is further configured to:

select the partition template from a plurality of partition templates based on visual content of the first content item; and divide the visual content into the plurality of segments in accordance with the partition template, responsive to selecting the partition template from the plurality of partition templates.

12. The system of claim 10, wherein the data processing system is further configured to:

determine for each partition template of plurality of partition templates, a predicted interaction rate with the visual content divided in accordance with a corresponding partition template;

select the partition template from the plurality of partition templates based on the predicted interaction rate determined for each partition template of the plurality of partition templates; and divide the visual content into the plurality of segments in accordance with the partition template, responsive to selecting the partition template from the plurality of partition templates.

13. The system of claim 10, wherein the data processing system is further configured to:

determine that the first content item is eligible for addition of interactivity based on the visual content of the first content item; and divide the visual content into the plurality of segments in accordance with the partition template, responsive to determining that the first content item is eligible.

14. The system of claim 10, wherein the data processing system is further configured to:
 identify an initial plurality of positions for the plurality of segments as the target plurality of positions, each position of the initial plurality of positions defining a region within the visual content of the first content item from which the segment is taken; and
 generate the second content item to include the second script configured to determine, responsive to detection of the interaction with one of the plurality of segments, that the plurality of segments are moved from the plurality of positions to the initial plurality of positions.

15. The system of claim 10, wherein the data processing system is further configured to:
 generate the second content item to include the second script configured to:
  present a prompt for initiation of interactivity with the second content item within the frame; and
  present, responsive to detecting an interaction with the prompt, the plurality of segments within the frame in accordance with the plurality of positions.

16. The system of claim 10, wherein the data processing system is further configured to:
 divide the visual content into the plurality of segments in accordance with the partition template, the partition template including a segmentation path to define the number of segments to be formed, the shape for each segment of the plurality of segments, and the dimensions for each shape.

17. The system of claim 10, wherein the data processing system is further configured to:
 receive, from a content provider, a request to include interactivity into content, the request including the first content item.

18. The system of claim 10, wherein the data processing system is further configured to:
 receive, from the client device responsive to opening the landing page, an indication that the plurality of segments are moved to the first plurality of positions.

* * * * *